United States Patent
Sinyard

(10) Patent No.: US 10,390,493 B2
(45) Date of Patent: Aug. 27, 2019

(54) POLE SAW CONVERSION DEVICE TO EXTEND AN OPERABLE REACH OF A CHAIN SAW

(71) Applicant: Gary Lynn Sinyard, Hope, AR (US)

(72) Inventor: Gary Lynn Sinyard, Hope, AR (US)

(*) Notice: Subject to any disclaimer, the term of this patent is extended or adjusted under 35 U.S.C. 154(b) by 15 days.

(21) Appl. No.: 15/436,470

(22) Filed: Feb. 17, 2017

(65) Prior Publication Data

US 2017/0231164 A1    Aug. 17, 2017

Related U.S. Application Data

(60) Provisional application No. 62/296,397, filed on Feb. 17, 2016.

(51) Int. Cl.
*A01G 3/08*   (2006.01)
*B25G 1/04*   (2006.01)

(52) U.S. Cl.
CPC .............. *A01G 3/086* (2013.01); *B25G 1/04* (2013.01)

(58) Field of Classification Search
CPC ...... A01G 3/08; A01G 3/086; B27B 17/0008; B27B 17/0016; Y10T 83/95; Y10T 83/97; F16C 1/12; F16C 1/14; F16C 1/145; B25G 1/04
See application file for complete search history.

(56) References Cited

U.S. PATENT DOCUMENTS

| | | | | |
|---|---|---|---|---|
| 3,823,474 A | * | 7/1974 | Ionescu | B27B 17/0008 16/436 |
| 3,949,817 A | * | 4/1976 | Rice | A01G 3/08 16/427 |
| 4,351,209 A | * | 9/1982 | Alford | B23D 57/0092 108/119 |
| 4,359,822 A | * | 11/1982 | Kolodziejczyk | B27B 17/0008 173/170 |
| 5,787,536 A | * | 8/1998 | Pate | B27B 17/0008 30/122 |
| 2006/0283023 A1 | * | 12/2006 | Hesson | A01G 3/086 30/296.1 |

* cited by examiner

*Primary Examiner* — Jonathan G Riley
(74) *Attorney, Agent, or Firm* — Russ Weinzimmer & Associates, P.C.

(57) ABSTRACT

An apparatus is disclosed that is connectable to a conventional chain saw to extend the operable reach of the chain saw. This apparatus includes a support assembly to provide support against a user's leg or body portion when cutting an elevated item. The apparatus helps to elevate and control a chain saw, while cutting or trimming objects with the chain saw. The apparatus includes operationally secure mounting means to firmly engage the handles of the chain saw, and to maintain the saw in proper operative alignment and position. The apparatus reliably and securely engages a chain saw handle without requiring modification of the original chain saw equipment. The apparatus provides a mounting assembly which does not engage or otherwise adversely contact fragile plastic parts of the chain saw, such as the engine housing. The apparatus provides an assembly for remotely operating a throttle or a trigger of the chain saw.

13 Claims, 8 Drawing Sheets

POLE SAW CONVERSION DEVICE TO EXTEND AN OPERABLE REACH OF A CHAIN SAW

CROSS-REFERENCE TO RELATED APPLICATIONS

This application is based on the provisional application Ser. No. 62/296,397 filed Feb. 17, 2016 the entire contents of which are incorporated by reference in its entirety.

FIELD OF THE INVENTION

The present invention relates generally to chain saw accessories and controls. More particularly, the present invention relates to chain saw extension controllers enabling a chain saw user to reach elevated, hard-to-reach positions of a tree, for example, that need cutting, and which are otherwise difficult to access from the ground.

BACKGROUND OF THE INVENTION

It has long been recognized by those skilled in the art that hand-held chain saws are highly desirable and convenient for cutting and trimming a variety of objects such as trees, limbs, logs, and the like. Of course, it is well-recognized that while the saw is held by the hands of the user, its operational range is limited, largely because of the length of the saw. Accordingly, others have previously suggested various mechanical and electrical means for extending the reach of a chain saw, without requiring substantial modifications to the saw's original design or configuration.

For example, U.S. Pat. No. 3,731,380 issued May 8, 1973 discloses an extension pole for a chain saw which releasably engages a chain saw handle. A manually operable throttle control comprising an operating line extending longitudinally along the pole engages the saw throttle trigger for speed control. The pole mounting means releasably engages the handle of the saw.

U.S. Pat. No. 3,731,382 issued May 8, 1973 discloses an extensible chain saw insert that is adapted to be interposed between a chain saw motor unit and the cutting chain apparatus for extending the saw to different selected lengths. In this manner, a standing operator may cut and trim tree branches of substantial thickness that may be substantially elevated above ground.

U.S. Pat. No. 3,949,817 issued Apr. 13, 1976 discloses a chain saw extender for extending the reach of a portable chain saw for cutting tree limbs and branches which would otherwise be inaccessible to the operator. An elongated post which can be held in the hands is connected to the chain saw. A pivotable lever attached to the front end of the post contacts and depresses the power trigger on the chain saw. A finger operated control trigger is located at the rear end of the post, and means are provided for connecting the pivotable lever and the control trigger for manual speed control.

U.S. Pat. No. 4,359,822 issued Nov. 23, 1982 shows another power chain saw handle attachment adapting a chain saw for use in cutting underbrush, weeds, and the like. The curved handle attachment is detachably, pivotally fixed on the body of the power chain saw, and positions the cutting bar in a horizontal position instead of the conventional vertical position when the chain saw is being operated in a normal manner. The handle attachment is adjustable to accommodate users of different height. The handle of the chain saw attachment is provided with an adjustable position hand grip and throttle control assembly.

U.S. Pat. No. 4,638,562 issued Jan. 27, 1987 provides extension handles for electrical and gasoline-operated hedge type trimmers. Extension handle mounting assemblies can be securely clamped to the motor housing of the trimmers to provide one or more secure support points interconnecting the extension handles.

U.S. Pat. No. 4,999,917 issued Mar. 19, 1991 discloses a chain saw extension structure enabling a chain saw to functionally elongate and thus reach remote elevations. A drive transmitting extension structure fitted to a chain saw interconnects the saw drive motor and cutting head.

U.S. Pat. No. 5,884,403 issued Mar. 23, 1999 discloses an electric tree trimming apparatus including an elongate, telescoping, tubular handle having a bracket provided on its upper end that releasably mounts an electric chain saw. A coiled extension cord accommodated within the handle has a socket for releasable attachment to the saw's electric plug, with a second plug at its opposite end for connection to a power source. A remote trigger switch mounted on the handle is electrically coupled to the extension cord to remote power the saw.

U.S. Pat. No. 7,152,328 issued Dec. 26, 2006 discloses an electric pole saw with a powerhead mounting assembly comprising interlocking bracket halves molded to conform to the shape of the saw. Single-point fastening means enable fast and easy assembly of the bracket without tools.

SUMMARY OF THE INVENTION

The present invention resides in an improved apparatus for handling and controlling a conventional power chain saw, while extending the distance that an operator can reach when cutting or trimming. In effect, it converts the conventional chain saw into a "pole saw" that can be controlled by an operator on the ground, while safely reaching to extended heights to trim and cut elevated branches, tree limbs, and the like.

Thus an object of the invention is to enable the safe and efficient use of a conventional chain saw at an elevated and/or remote position spaced apart from the saw user.

A similar broad object is to provide means for increasing the work distances that an operator can safely reach.

It is another object of the present invention to provide a drive transmitting extension structure for a chain saw.

A related object is to provide an extension apparatus for extending the reach of a conventional chain saw.

Another basic object is to provide a system for converting a standard chain saw into a pole saw.

It is also an object to provide extension means for a chain saw through which an operator standing on the ground can safely and effectively trim elevated items such as branches, tree limbs, and the like.

Yet another object of the invention is to provide an improved extension pole for a chain saw with operationally secure mounting means to forcibly engage the handles of the saw and maintain the saw at the end of the pole in proper operative alignment and position.

Another object is to provide an apparatus of the character described which reliably and securely engages a chain saw handle without requiring modification of the original equipment saw structure.

A related object of the invention is to provide a mounting means of the character described which does not engage or otherwise adversely contact fragile plastic parts of the saw, such as the engine housing.

A further object is to provide a structure of the character described with remotely operable throttle or trigger operating means.

These and other objects and advantages of the present invention, along with features of novelty appurtenant thereto, will appear or become apparent in the course of the following descriptive sections.

A general aspect of the invention is an apparatus to be connected to a chain saw so as to extend an operable reach of the chain saw. The apparatus includes: a support assembly, the support assembly configured to abut against a portion of a user's body when cutting an elevated item so as to provide support and stabilization of the apparatus and chain saw during use; an extension assembly, the extension assembly operatively coupled to the support assembly, the extension assembly including a bar and a first bracket, the bar operatively coupled to the first bracket, the first bracket configured to engage a trigger handle of the chain saw; a mounting head assembly, the mounting head assembly operatively coupled to the extension assembly, the mounting head assembly including an arm and a second bracket, the arm operatively coupled to the second bracket, the second bracket configured to engage a primary handle of the chain saw; and a throttle assembly, the throttle assembly including a cable, a carriage assembly, and a third bracket, the cable operatively coupled to at least one of the support assembly and the extension assembly, the third bracket configured to engage the trigger handle of the chain saw, the carriage assembly selectively depressing a trigger of the chainsaw in response to the user selectively tensioning the cable, thereby providing a desired engine speed of the chain saw.

In some embodiments, the extension assembly includes: a first bar, a second bar, and a first pin, the first bar slidably receivable within the second bar, the first and second bars including a plurality of orifices alignable by telescoping the first and second bars to receive the first pin, thereby fixing the extension assembly at a desired length.

In some embodiments, the bar is at least one of: round, square, and rectangular.

In some embodiments, the support assembly includes: an anchor member and a first stub, the anchor member operatively coupled to the first stub, the first stub removably attachable to the extension assembly, the anchor member abutting against a portion of the user during operation, thereby supporting and stabilizing the apparatus.

In some embodiments, the anchor member is arcuate.

In some embodiments, the anchor member is configured to abut against a leg of the user during operation of the chain saw.

In some embodiments, the mounting head assembly includes: a plurality of arms, a second stub, and a plurality of second brackets, each of the plurality of second brackets operatively coupled to one of the plurality of arms, the plurality of arms operatively coupled to the second stub, the second stub slidably receivable around the extension assembly such that the first bracket of the extension assembly extends beyond the second stub.

In some embodiments, the extension assembly is slidably receivable within the mounting head assembly such that the first bracket extends beyond the mounting head assembly.

In some embodiments, the apparatus further includes: a plurality of mounting head assemblies, each of the plurality of mounting head assemblies being removably attachable to the extension assembly, each of the plurality of mounting head assemblies configured to engage the primary handle of at least one of a plurality of different chain saws, each of the plurality of different chain saws including at least one of a different manufacturer and a different model designation.

In some embodiments, the carriage assembly includes: a U-shaped carriage, a frame plate, and a second pin, the frame plate including downwardly disposed guide legs, each of the guide legs including an elongated follower slot, the U-shaped carriage slidably disposed over the guide legs, the second pin extending though orifices in the U-shaped carriage and the elongated follower slot in the guide legs, the cable operatively coupled to the U-shaped carriage, the second pin confined with the follower slot in each of the guide legs, the second pin selectively urged against the trigger of the chain saw in response to the cable being selectively tensioned.

In some embodiments, the apparatus further includes: a cable guide operatively coupled to at least one of: the support assembly; the extension assembly; the mounting head assembly; and the throttle assembly, the cable slidably disposed within the cable guide.

Another general aspect of the invention is an apparatus to be connected to a chain saw so as to extend an operable reach of the chain saw. This apparatus includes: a support assembly, the support assembly configured to provide support for the apparatus and chain saw when cutting an elevated item, the support assembly including an anchor member and a first stub, the anchor member operatively coupled to the first stub, the first stub removably attachable to the extension assembly, the anchor member abutting against a portion of the user during operation, thereby supporting and stabilizing the apparatus; an extension assembly, the extension assembly operatively coupled to the support assembly, the extension assembly including a bar and a first bracket, the bar operatively coupled to the first bracket, the first bracket configured to engage a trigger handle of the chain saw; a mounting head assembly, the mounting head assembly operatively coupled to the extension assembly, the mounting head assembly including a plurality of arms, a second stub, and a plurality of second brackets, the plurality of arms operatively coupled to the second stub, each of the plurality of second brackets operatively coupled to one of the plurality of arms, the plurality of second brackets configured to engage a primary handle of the chain saw, the second stub slidably receivable around the extension assembly such that the first bracket of the extension assembly extends beyond the second stub; a throttle assembly, the throttle assembly including a cable, a carriage assembly, and a third bracket, the cable operatively coupled to at least one of the support assembly and the extension assembly, the third bracket configured to engage the trigger handle of the chain saw, the carriage assembly selectively depressing a trigger of the chainsaw in response to the user selectively tensioning the cable, thereby providing a desired engine speed of the chain saw; and a cable guide operatively coupled to at least one of the support assembly, the extension assembly, the mounting head assembly, and the throttle assembly, the cable being slidably disposed within the cable guide.

In some embodiments, the extension assembly includes: a first bar, a second bar, and a first pin, the first bar slidably receivable within the second bar, the first and second bars including a plurality of orifices alignable by telescoping the first and second bars to receive the first pin, thereby fixing the extension assembly at a desired length.

In some embodiments, the anchor member is arcuate.

In some embodiments, the anchor member is configured to abut against a leg of the user during operation.

In some embodiments, the extension assembly is slidably receivable within the mounting head assembly such that the first bracket extends beyond the mounting head assembly.

In some embodiments, the apparatus further includes: a plurality of mounting head assemblies, each of the plurality of mounting head assemblies being removably attachable to the extension assembly, each of the plurality of mounting head assemblies being configured to engage the primary handle of at least one of a plurality of chain saws, each of the plurality of chain saws including at least one of a different manufacturer and a different model designation.

In some embodiments, the carriage assembly includes: a U-shaped carriage, a frame plate, and a second pin, the frame plate including downwardly disposed guide legs, each of the guide legs including an elongated follower slot, the U-shaped carriage slidably disposed over the guide legs, the second pin extending though orifices in the U-shaped carriage and the elongated follower slot in the guide legs, the cable being operatively coupled to the U-shaped carriage, the second pin being confined with the follower slot in each of the guide legs, the second pin being selectively urged against the trigger of the chain saw in response to the cable being selectively tensioned by the user.

Another general aspect of the invention is an extended-reach chain saw that includes: a chain saw; a support assembly, the support assembly configured to provide support for the chain saw, the support assembly including an anchor member and a first stub, the anchor member being operatively coupled to the first stub, the first stub being removably attachable to the extension assembly, the anchor member being arcuate, the anchor member abutting against a portion of the user during operation, thereby supporting and stabilizing the chain saw; an extension assembly, the extension assembly operatively coupled to the support assembly, wherein the extension assembly includes a first bar, a second bar, a first pin, and a first bracket, the first bar being slidably receivable within the second bar, the first and second bars including a plurality of orifices alignable by telescoping the first and second bars to receive the first pin, thereby fixing the extension assembly at a desired length, one of the first bar and second bar operatively coupled to the first bracket, the first bracket being configured to engage a trigger handle of the chain saw; a mounting head assembly, the mounting head assembly being operatively coupled to the extension assembly, the mounting head assembly including a plurality of arms, a second stub, and a plurality of second brackets, the plurality of arms being operatively coupled to the second stub, each of the plurality of second brackets being operatively coupled to one of the plurality of arms, the plurality of second brackets being configured to engage a primary handle of the chain saw, the second stub being slidably receivable around the extension assembly such that the first bracket of the extension assembly extends beyond the second stub; a throttle assembly, the throttle assembly including a cable, a carriage assembly, and a third bracket, the cable being operatively coupled to at least one of the support assembly and the extension assembly, the third bracket being configured to engage the trigger handle of the chain saw, the carriage assembly selectively depressing a trigger of the chainsaw in response to a user selectively tensioning the cable, thereby providing a desired engine speed of the chain saw, wherein the carriage assembly includes a U-shaped carriage, a frame plate, and a second pin, the frame plate including downwardly disposed guide legs, each of the guide legs including an elongated follower slot, the U-shaped carriage being slidably disposed over the guide legs, the second pin extending though orifices in the U-shaped carriage and the elongated follower slot in each of the guide legs, the cable being operatively coupled to the U-shaped carriage, the second pin being confined with the follower slot in each of the guide legs, the second pin being selectively urged against the trigger of the chain saw in response to the cable being selectively tensioned by the user; and a cable guide operatively coupled to at least one of: the support assembly, the extension assembly, the mounting head assembly, the throttle assembly, the cable being slidably disposed within the cable guide.

In some embodiments, the extended-reach chain saw further includes: a plurality of mounting head assemblies, each of the plurality of mounting head assemblies being removably attachable to the extension assembly, each of the plurality of mounting head assemblies being configured to engage the primary handle of at least one of a plurality of different chain saws, each of the plurality of different chain saws including at least one of a different manufacturer and a different model designation.

BRIEF DESCRIPTION OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION

Figure 1:
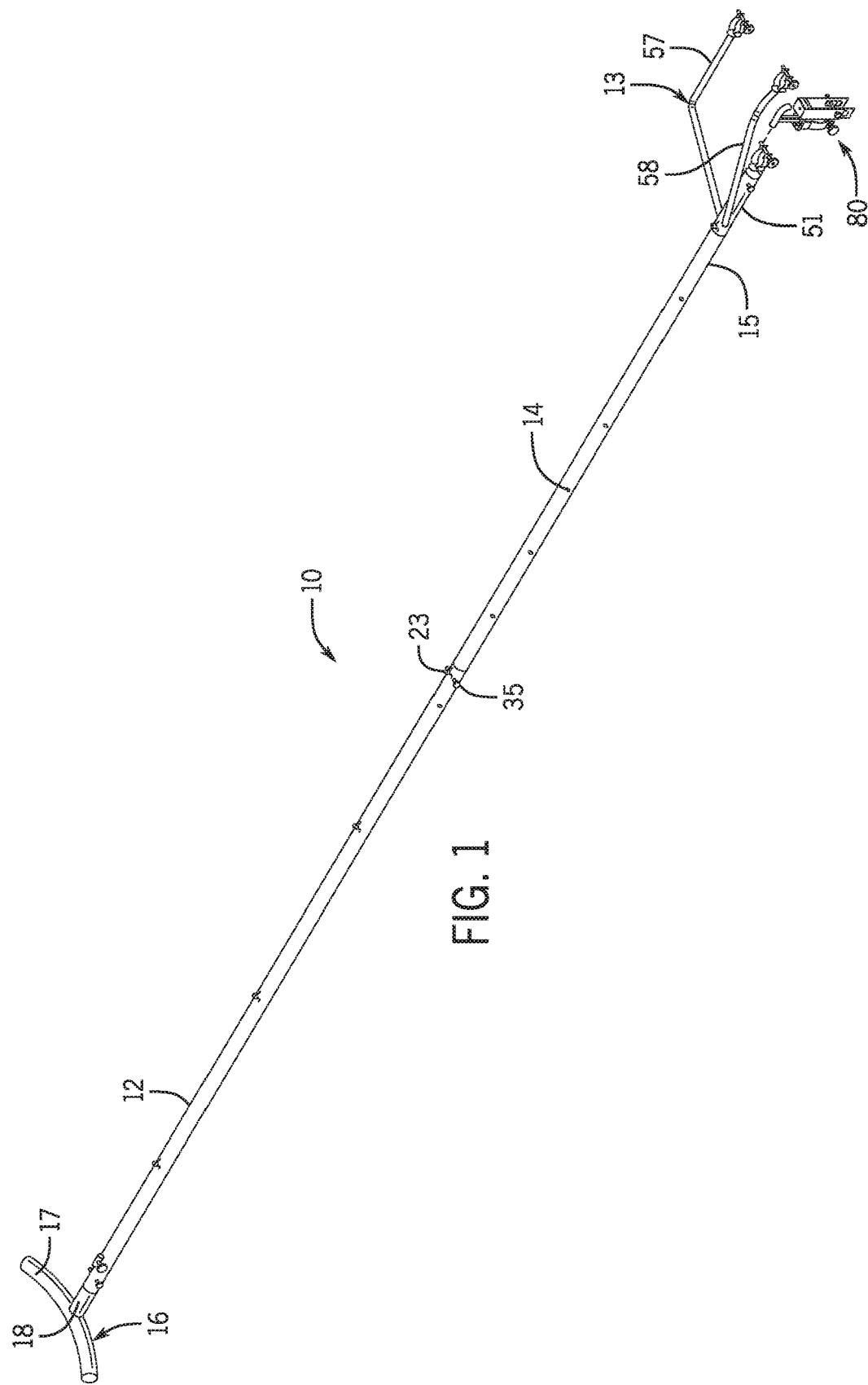
FIG. 1 is an isometric view of the assembled Pole Saw Conversion Device.
Figure 2:
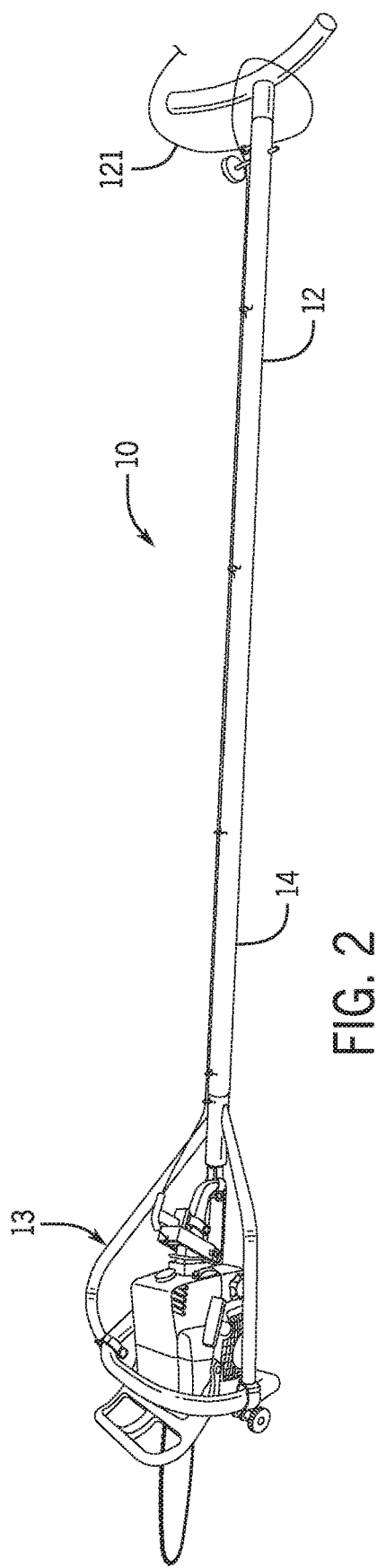
FIG. 2 is an isometric view showing the conversion device connected to a conventional chain saw.

With initial reference now to FIGS. 1-4 of the appended drawings, the pole saw conversion apparatus has been generally designated by the reference numeral 10. The conversion apparatus includes an inner, substantially rigid, tubular pole segment 12 that is coaxially coupled to an outermost, cooperating pole segment 14. The lower pole segment 12, which is closest to the ground during operation, mounts a leg support 16 that abuts the leg or body of the user for support and stabilization during use. The outermost pole segment 14 (FIG. 4) has a terminal end 15 that is fitted to a mounting head 13 (i.e. FIG. 5) that grasps a chain saw 25 (FIG. 8) for elevated use.

Figure 3:
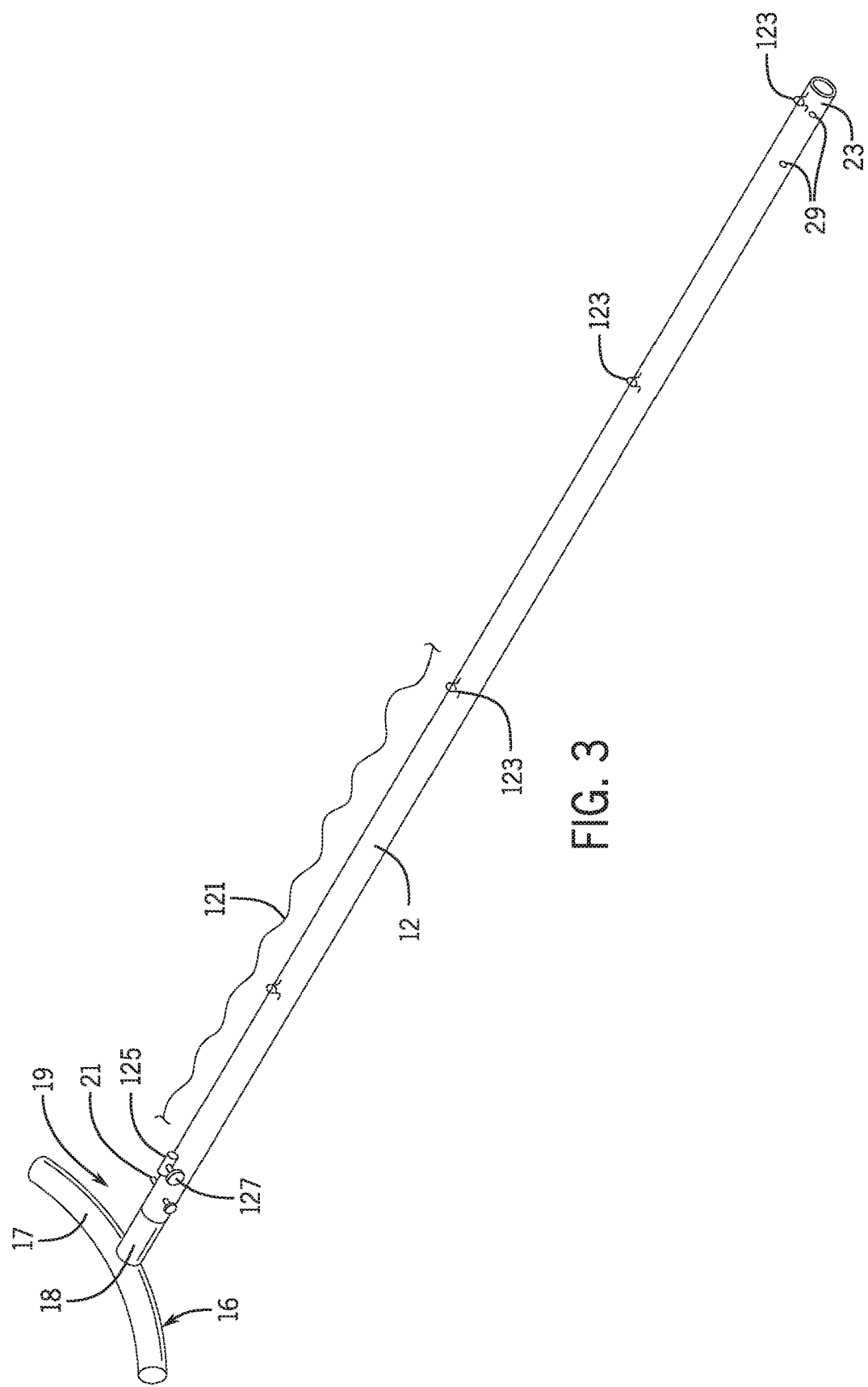
FIG. 3 is an enlarged, fragmentary, isometric view of the device, showing the handle, the leg mount, and outer pole portion.
Figure 4:
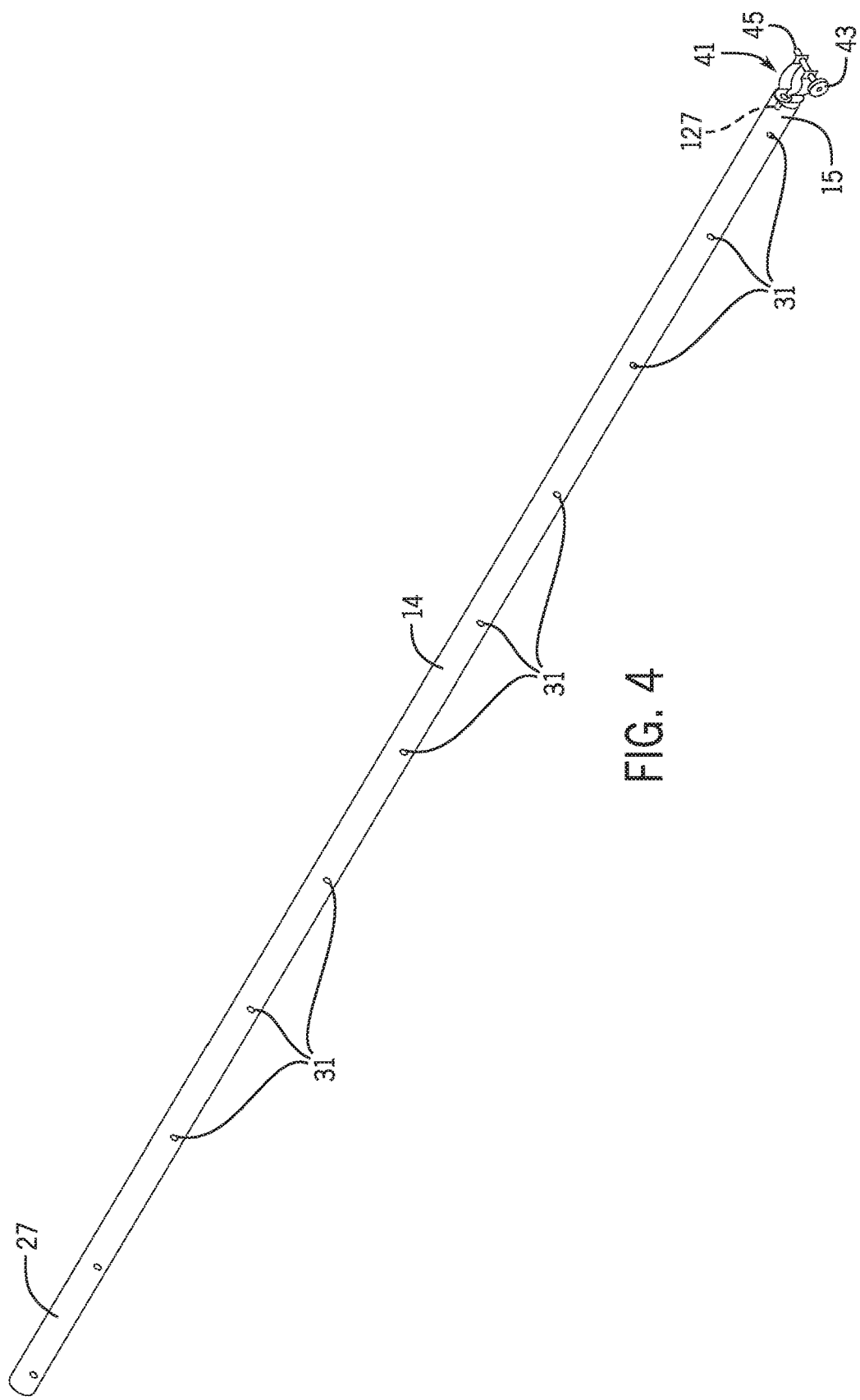
FIG. 4 is an enlarged, fragmentary, isometric view of the device, showing the inner extension pole.

During use of the conversion apparatus 10 substantial weight is transferred to and bears against the user by a leg support 16 which physically contacts and bears against the user's body, preferably one of his or her legs. Leg support 16 includes an arcuate anchor 17 that is welded to an integral stub 18 at the anchor midsection. The cylindrical, projecting anchor stub 18 is coaxially fitted within the tubular operator end 19 (FIG. 3) of inner pole segment 12, being retained by clevis pin 21 inserted through appropriate aligned orifices. The far end 23 of pole segment 12 is coaxially fitted to the inner end 27 (FIG. 4) of the outermost pole segment 14. It will be noted that pole segment 12 includes a plurality of orifices 29 defined within end 23 (FIG. 3). A plurality of similar, spaced apart orifices 31 are defined along the length of outermost pole segment 14 (FIG. 4). Thus, pole segment 14 can be telescopically and coaxially received within pole segment 12, such that selected orifices 31 can be aligned with orifices 29 (FIG. 3), whereupon the axially aligned pole segments 12,14 may be pinned together with clevis pin 35 (FIG. 1) so that the apparatus assumes a desired length. With the chain saw 25 elevated and aimed at a target, substantial weight is transferred along the length of the aligned pole segments 12,14 to the user by leg support 16. Stabilization of the apparatus 10 is increased when the user manually grasps the inner pole segment 12.

Figure 5:
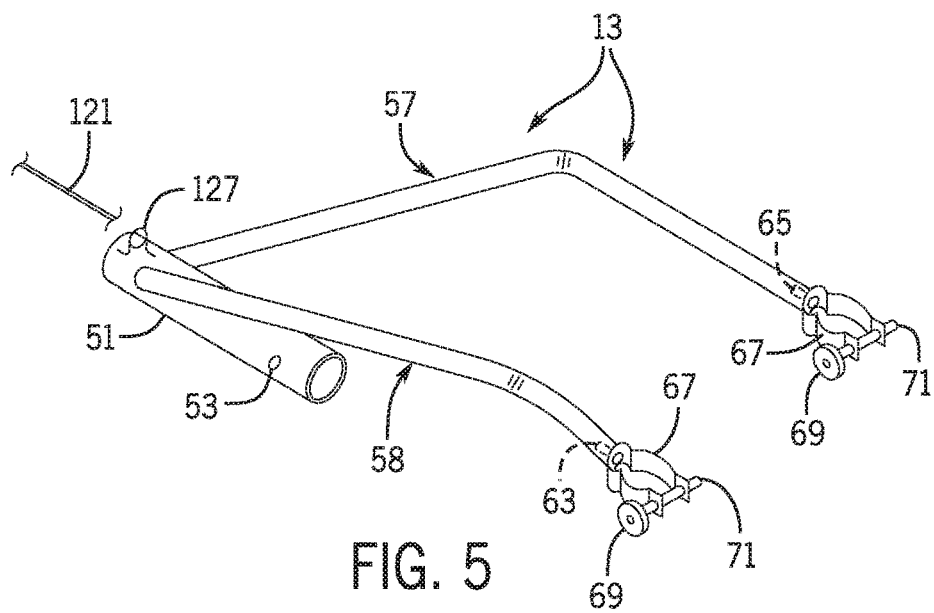
FIG. 5 is an enlarged, isometric view of a preferred mounting head.

The apparatus 10 is primarily coupled to the chain saw 25 through a mounting head 13 (FIG. 5). However, the terminal end 15 of outermost pole segment 14 coaxially mounts and receives a first compression bracket 41 (FIG. 4) that also couples to the chain saw as explained hereinafter. Bracket 42 can be tightened by a knob 43 that operates threaded shaft 45 to compress the bracket jaws. Head 13 includes a rigid tubular stub 51 (FIG. 5) that coaxially mounts pole segment 14. During assembly, the inner end 27 (FIG. 4) of the outermost pole segment 14 is inserted through stub 51, and the mounting head 13 is slid along the pole length to the position of FIG. 1, whereby a pin may be inserted through stub orifice 53 to secure head 13 as the pin registered with an aligned orifice 31. At this point, bracket 41 (FIG. 4) will project outwardly of head stub 51 (i.e. FIGS. 1, 8) towards the chain saw 25.

Figure 8:
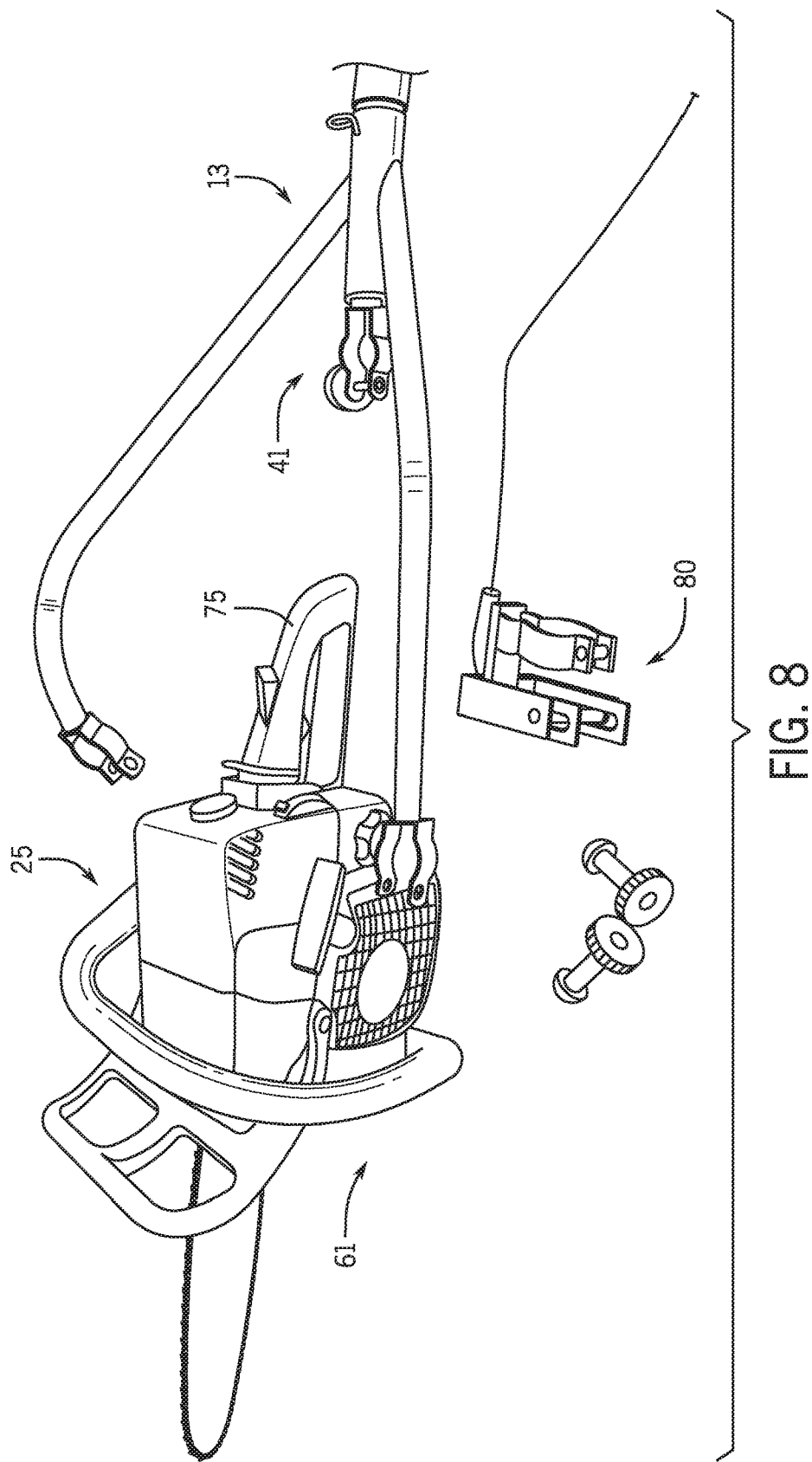
FIG. 8 is an enlarged, fragmentary isometric view showing portions of a conventional chain saw with the mounting head and throttle assembly positioned adjacent to the saw handle for subsequent interconnection; and, FIG. 9 is an enlarged, fragmentary isometric view of the mounting head and throttle assembly connected to the saw handle.
Figure 9:
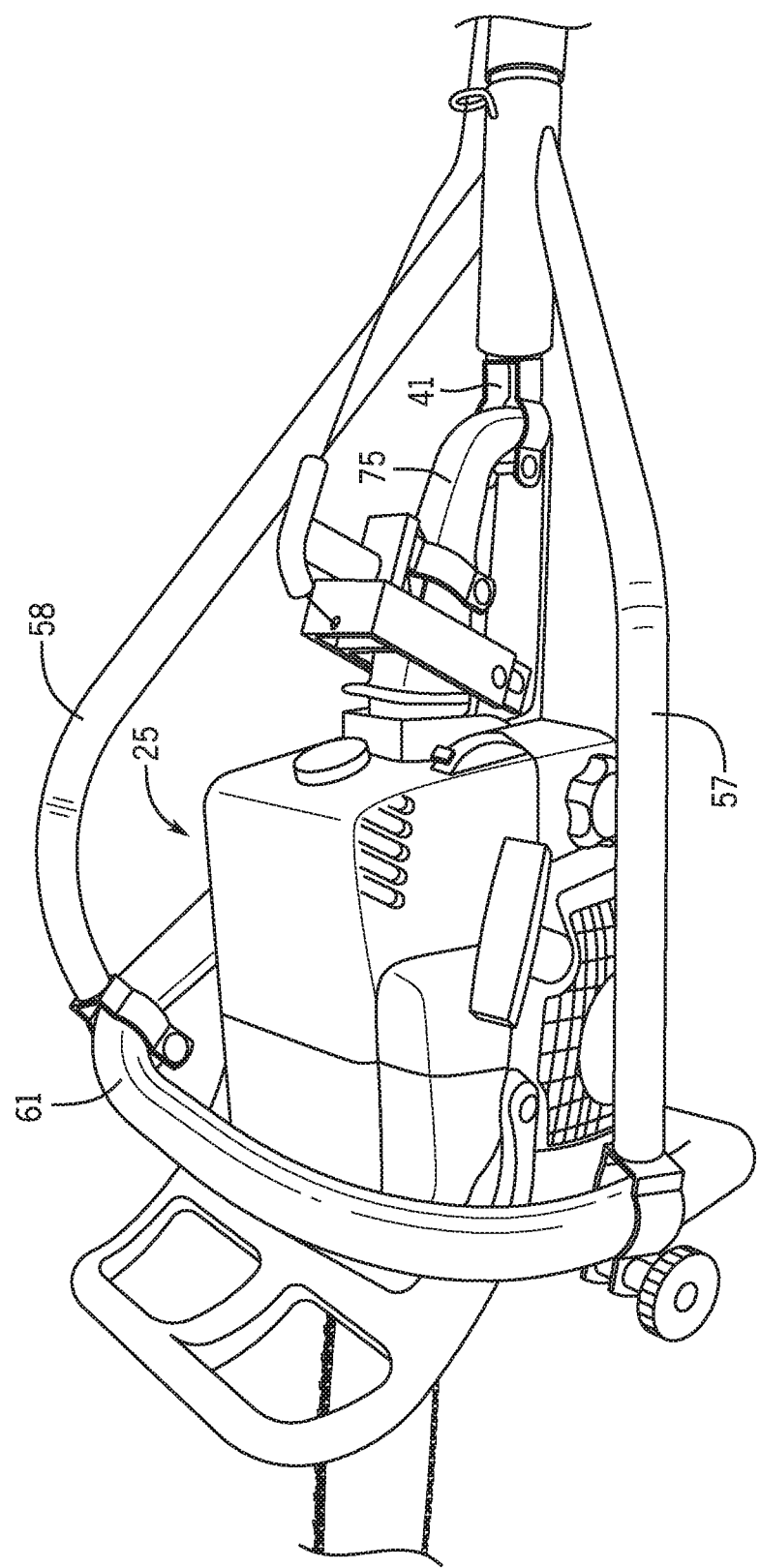

The mounting head 13 has a pair of rigid, projecting arms 57, 58 that are adapted to grasp the primary handle 61 of the chain saw 25 (FIGS. 8, 9). Arms 57, 58 are angled and configured to appropriately mate with the handle apparatus of the chain saw involved; different brands of chainsaws often necessitate different configurations of the arms 57, 58, but all preferred mounting heads used with the apparatus 10 include a pair of rigid, outwardly diverging arms suitably welded to the mounting head stub as seen in FIG. 5. The extreme ends of the arms 57, 58 are solid and threaded, so as to receive suitable threaded bolts 63, 65 (FIG. 5) that secure additional compression brackets 67. Each of the compression brackets 67 is similar to compression bracket 41 (i.e., FIG. 4). Each has a knurled knob 69 that can be rotated to tighten threaded bolts 71 so that brackets 67 each compressively engage opposite sides of the saw handle portion 61 (FIG. 9). At the same time, the compression bracket 41 will engage the saws trigger handle 75 (FIG. 9). Once the various compression brackets 41, 67 are mechanically placed over appropriate saw structure, the knobs 43, 69 may be threadably attached and manually tightened as required.

Substantially contemporaneously with mounting of the apparatus 10 to the chain saw 25 as aforesaid, a throttle assembly 80 (FIG. 6) is secured over the original equipment chain saw trigger handle 75. The throttle assembly 80 has an inner end 81 that faces the user during operation. A rigid steel frame 83 includes a flat, horizontally oriented (i.e. as viewed in FIG. 6) plate 85 that supports a downwardly projecting compression bracket 87 that is similar to compression brackets discussed above. A knob 89 may be rotated to tighten threaded bolt 91 to compress the halves of the bracket 87 about the chain saw trigger handle. Bracket 87 is secured to plate 85 by a suitable bolt 93.

The carriage assembly 80 has a rigid frame plate 85 supporting a pair of downwardly projecting, spaced apart, guide legs 95, 97 are provided with suitable, elongated follower slots 99, 100 respectively. A generally U-shaped carriage 103 is slidably disposed over guide legs 95, 97. The carriage 103 includes spaced apart, downwardly projecting, rectangular legs 109, 111 that are perpendicular to an integral top 110. A transverse clevis pin 113 extends between carriage legs 109, 111 through the aligned follower slots 99, 100, being secured by an R-pin 115. Thus the carriage 103 can be displaced relative to the guide legs 95, 97. When mounting the carriage assembly 80 to the chain saw, the clevis pin 113 will be positioned adjacent and below the chain saw motor-control trigger as in FIG. 9. This OEM trigger is spring-biased to the minimum RPM position. The pin 113 must be displaced to pressure the OEM switch and speed the chain saw motor up.

Figure 6:
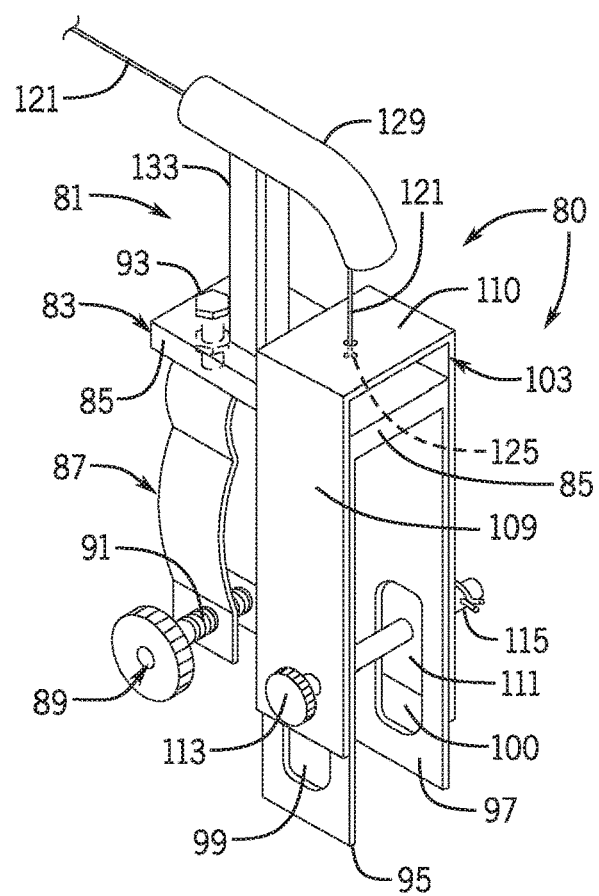
FIG. 6 is an enlarged, isometric view of a preferred throttle assembly.
Figure 7:
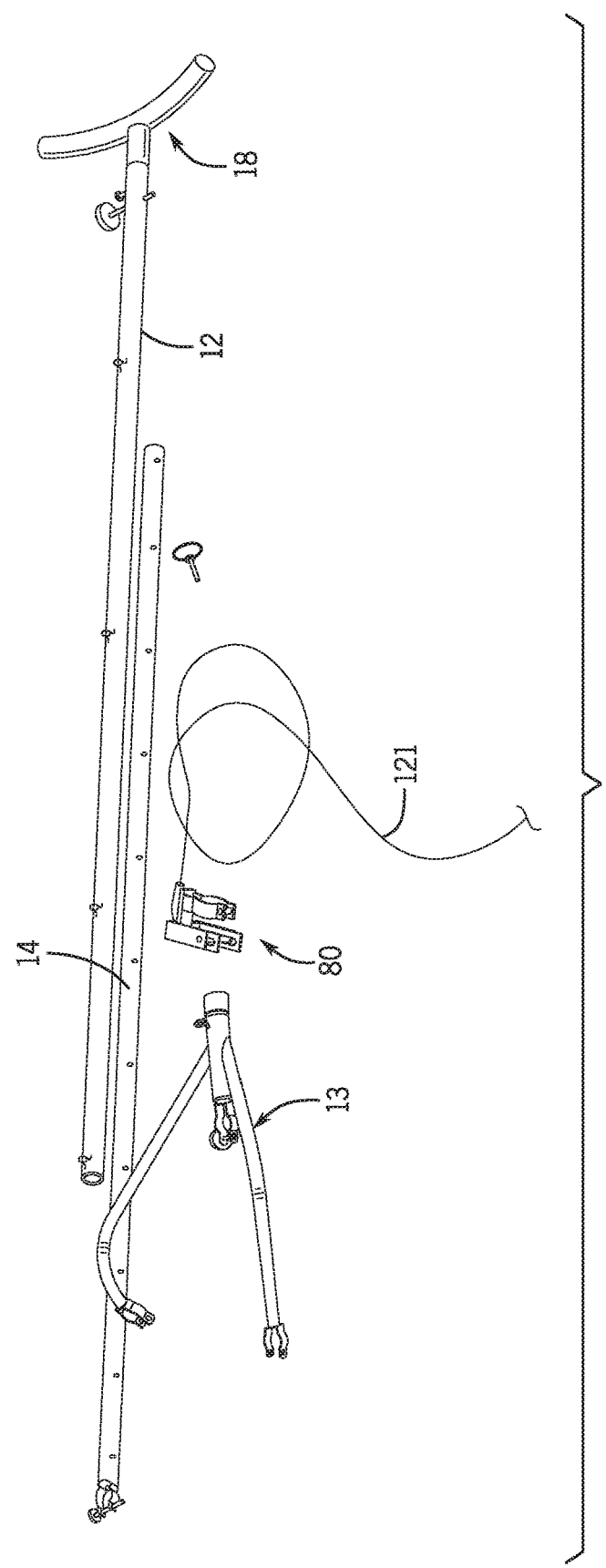
FIG. 7 is an isometric view of the device unassembled.

Thus when the carriage 103 is displaced up-and-down relative to the walls 95 and 97, the pin 113 carried by the carriage 103 is moved upwardly or downwardly for motor trigger control. To operate the carriage 103 (FIG. 6), and thus the chain saw trigger, there is an elongated, braided steel cable 121 extending between the carriage top 110 (FIG. 6) and the operator end 19 (FIG. 3) of the inner pole segment 12. Cable 121 (FIG. 3) is routed through a plurality of line guides 123 affixed along the length of the pole sections. The operator end seen in FIG. 3 is affixed within a tube anchor 125 and retained by an adjustment knob 127 when pulled to a sufficient tension by the operator to achieve a desired chain saw motor speed. The cable 121 passes through another line guide 127 at the inner end of the head stub 51 (FIG. 5), and from there through an arcuate cable guide tube 129 at the top of plate 85, which is secured thereto by a rigid standoff 133 (FIG. 6). Line exiting the guide tube 129 is anchored to the carriage by fastener 126 (FIG. 6). Thus deflection of the cable 121 (i.e., by pulling by the operator) raises the carriage 103 and depresses the OEM saw trigger to increase engine speed. Full release of the cable 121 releases the saw trigger, which moves back from internal spring pressure to lower the motor RPM to idle.

From the foregoing, it will be seen that this invention is one well-adapted to obtain all the ends and objects herein set forth, together with other advantages which are inherent to the structure.

It will be understood that certain features and sub-combinations are of Utility, and may be employed without reference to other features and sub-combinations.

As many possible embodiments can be made of the invention without departing from the scope thereof, it is to be understood that all matter herein set forth or shown in the accompanying drawings is to be interpreted as illustrative and not in a limiting sense.

What is claimed is:

1. An apparatus to be connected to a chain saw so as to extend an operable reach of the chain saw, the apparatus comprising:
   a support assembly, the support assembly configured to abut against a portion of a user's body when cutting an elevated item so as to provide support and stabilization of the apparatus and chain saw during use;
   an extension assembly, the extension assembly operatively coupled to the support assembly, the extension assembly including a bar and a first bracket, the bar operatively coupled to the first bracket, the first bracket configured to engage a trigger handle of the chain saw;

a mounting head assembly, the mounting head assembly operatively coupled to the extension assembly, the mounting head assembly including an arm and a second bracket, the arm operatively coupled to the second bracket, the second bracket configured to engage a primary handle of the chain saw; and a throttle assembly, the throttle assembly including: a cable, a carriage assembly, and a third bracket, the cable operatively coupled to at least one of the support assembly and the extension assembly, the third bracket configured to engage the trigger handle of the chain saw, the carriage assembly configured to selectively depress a trigger of the chainsaw in response to the user selectively tensioning the cable, thereby providing a desired engine speed of the chain saw, the carriage assembly including: a U-shaped carriage, a frame plate, and a second pin, the frame plate including downwardly disposed guide legs, each of the guide legs including an elongated follower slot, the U-shaped carriage slidably disposed over the guide legs, the second pin extending though orifices in the U-shaped carriage and the elongated follower slot in the guide legs, the cable operatively coupled to the U-shaped carriage, the second pin confined with the follower slot in each of the guide legs, the second pin selectively urged against the trigger of the chain saw in response to the cable being selectively tensioned.

2. The apparatus of claim 1, wherein the extension assembly comprises:

a first bar, a second bar, and a first pin, the first bar slidably receivable within the second bar, the first and second bars including a plurality of orifices alignable by telescoping the first and second bars to receive the first pin, thereby fixing the extension assembly at a desired length.

3. The apparatus of claim 1, wherein the bar is at least one of:

round, square, rectangular.

4. The apparatus of claim 1, wherein the support assembly comprises:

an anchor member and a first stub, the anchor member operatively coupled to the first stub, the first stub removably attachable to the extension assembly, the anchor member abutting against a portion of the user during operation, thereby supporting and stabilizing the apparatus.

5. The apparatus of claim 4, wherein the anchor member is arcuate.

6. The apparatus of claim 4, wherein the anchor member is curved to abut against a leg of the user during operation of the chain saw.

7. The apparatus of claim 1, wherein the mounting head assembly comprises: a plurality of arms, a second stub, and wherein the second bracket is a plurality of brackets, each of the plurality of second brackets operatively coupled to one of the plurality of arms, the plurality of arms operatively coupled to the second stub, the second stub slidably receivable around the extension assembly such that the first bracket of the extension assembly extends beyond the second stub.

8. The apparatus of claim 1, further comprising:

a cable guide operatively coupled to at least one of:

the support assembly, the extension assembly, the mounting head assembly, the throttle assembly, the cable slidably disposed within the cable guide.

9. An apparatus to be connected to a chain saw so as to extend an operable reach of the chain saw, the apparatus comprising:

a support assembly, the support assembly configured to provide support for the apparatus and chain saw when cutting an elevated item, the support assembly including an anchor member and a first stub, the anchor member operatively coupled to the first stub, the first stub removably attachable to the extension assembly, the anchor member abutting against a portion of the user during operation, thereby supporting and stabilizing the apparatus;

an extension assembly, the extension assembly operatively coupled to the support assembly, the extension assembly including a bar and a first bracket, the bar operatively coupled to the first bracket, the first bracket configured to engage a trigger handle of the chain saw;

a mounting head assembly, the mounting head assembly operatively coupled to the extension assembly, the mounting head assembly including a plurality of arms, a second stub, and a plurality of second brackets, the plurality of arms operatively coupled to the second stub, each of the plurality of second brackets operatively coupled to one of the plurality of arms, the plurality of second brackets configured to engage a primary handle of the chain saw, the second stub slidably receivable around the extension assembly such that the first bracket of the extension assembly extends beyond the second stub;

a throttle assembly, the throttle assembly including a cable, a carriage assembly, and a third bracket, the cable operatively coupled to at least one of the support assembly and the extension assembly, the third bracket configured to engage the trigger handle of the chain saw, the carriage assembly configured to selectively depress a trigger of the chainsaw in response to the user selectively tensioning the cable, thereby providing a desired engine speed of the chain saw, the carriage assembly including: a U-shaped carriage, a frame plate, and a second pin, the frame plate including downwardly disposed guide legs, each of the guide legs including an elongated follower slot, the U-shaped carriage slidably disposed over the guide legs, the second pin extending though orifices in the U-shaped carriage and the elongated follower slot in the guide legs, the cable being operatively coupled to the U-shaped carriage, the second pin being confined with the follower slot in each of the guide legs, the second pin being selectively urged against the trigger of the chain saw in response to the cable being selectively tensioned by the user; and a cable guide operatively coupled to at least one of the support assembly, the extension assembly, the mounting head assembly, and the throttle assembly, the cable being slidably disposed within the cable guide.

10. The apparatus of claim 9, wherein the extension assembly comprises:

a first bar, a second bar, and a first pin, the first bar slidably receivable within the second bar, the first and second bars including a plurality of orifices alignable by telescoping the first and second bars to receive the first pin, thereby fixing the extension assembly at a desired length.

11. The apparatus of claim 9, wherein the anchor member is arcuate.

12. The apparatus of claim 9, wherein the anchor member is curved to abut against a leg of the user during operation of the chain saw.

13. An extended-reach chain saw comprising:
a chain saw;
a support assembly, the support assembly configured to provide support for the chain saw, the support assembly including an anchor member and a first stub, the anchor member being operatively coupled to the first stub, the first stub being removably attachable to the extension assembly, the anchor member being arcuate, the anchor member abutting against a portion of the user during operation, thereby supporting and stabilizing the chain saw;
an extension assembly, the extension assembly operatively coupled to the support assembly, wherein the extension assembly includes a first bar, a second bar, a first pin, and a first bracket, the first bar being slidably receivable within the second bar, the first and second bars including a plurality of orifices alignable by telescoping the first and second bars to receive the first pin, thereby fixing the extension assembly at a desired length, one of the first bar and second bar operatively coupled to the first bracket, the first bracket being configured to engage a trigger handle of the chain saw;
a mounting head assembly, the mounting head assembly being operatively coupled to the extension assembly, the mounting head assembly including a plurality of arms, a second stub, and a plurality of second brackets, the plurality of arms being operatively coupled to the second stub, each of the plurality of second brackets being operatively coupled to one of the plurality of arms, the plurality of second brackets being configured to engage a primary handle of the chain saw, the second stub being slidably receivable around the extension assembly such that the first bracket of the extension assembly extends beyond the second stub;
a throttle assembly, the throttle assembly including a cable, a carriage assembly, and a third bracket, the cable being operatively coupled to at least one of the support assembly and the extension assembly, the third bracket being configured to engage the trigger handle of the chain saw, the carriage assembly selectively depressing a trigger of the chainsaw in response to a user selectively tensioning the cable, thereby providing a desired engine speed of the chain saw, wherein the carriage assembly includes a U-shaped carriage, a frame plate, and a second pin, the frame plate including downwardly disposed guide legs, each of the guide legs including an elongated follower slot, the U-shaped carriage being slidably disposed over the guide legs, the second pin extending though orifices in the U-shaped carriage and the elongated follower slot in each of the guide legs, the cable being operatively coupled to the U-shaped carriage, the second pin being confined with the follower slot in each of the guide legs, the second pin being selectively urged against the trigger of the chain saw in response to the cable being selectively tensioned by the user; and
a cable guide operatively coupled to at least one of:
the support assembly, the extension assembly, the mounting head assembly, the throttle assembly,
the cable being slidably disposed within the cable guide.

* * * * *